(12) United States Patent
Houghton

(10) Patent No.: US 7,299,909 B1
(45) Date of Patent: Nov. 27, 2007

(54) TAPER SLEEVE FOR CONVEYOR ROLLER

(75) Inventor: Harry E. Houghton, Orland Park, IL (US)

(73) Assignee: Automotion, Inc., Oak Lawn, IL (US)

( * ) Notice: Subject to any disclaimer, the term of this patent is extended or adjusted under 35 U.S.C. 154(b) by 0 days.

(21) Appl. No.: 11/484,392

(22) Filed: Jul. 11, 2006

Related U.S. Application Data

(60) Provisional application No. 60/698,822, filed on Jul. 13, 2005.

(51) Int. Cl.
*B65G 13/00* (2006.01)

(52) U.S. Cl. ...................... 193/37; 193/35 R

(58) Field of Classification Search ............ 198/831, 198/835; 193/35 R, 37
See application file for complete search history.

(56) References Cited

U.S. PATENT DOCUMENTS

| | | | | |
|---|---|---|---|---|
| 3,237,754 A | * | 3/1966 | Kraft, Jr. et al. | 198/831 |
| 3,901,379 A | * | 8/1975 | Bruhm | 198/831 |
| 3,934,951 A | | 1/1976 | Stumpf | |
| 4,097,095 A | * | 6/1978 | Zimmer | 384/465 |
| 4,790,421 A | * | 12/1988 | Gorges | 193/37 |
| 4,896,758 A | * | 1/1990 | Hoszowski | 193/37 |
| 5,107,982 A | * | 4/1992 | Walter | 198/781.04 |
| 5,667,058 A | * | 9/1997 | Bonnet | 198/831 |
| 5,722,531 A | * | 3/1998 | Zimny et al. | 198/831 |
| D460,239 S | * | 7/2002 | Nimmo et al. | D34/35 |
| 6,523,665 B2 | * | 2/2003 | Nimmo et al. | 193/35 R |
| 7,114,613 B2 | * | 10/2006 | Brouwer et al. | 198/786 |

* cited by examiner

*Primary Examiner*—Douglas A Hess
(74) *Attorney, Agent, or Firm*—Wood, Phillips, Katz, Clark & Mortimer

(57) ABSTRACT

A taper sleeve for a conveyor roller used in a curved conveyor section has a taper wall with internal radial ribs which mate with the surface of a cylindrical roller core. The inner edges of the ribs preferably have an interference fit with the core surface.

7 Claims, 1 Drawing Sheet

TAPER SLEEVE FOR CONVEYOR ROLLER

CROSS-REFERENCE TO RELATED APPLICATIONS

This application is a continuation of Houghton Ser. No. 60/698,822 filed Jul. 13, 2005.

BACKGROUND OF THE INVENTION

A curved section of a roller conveyor uses tapered rollers to move articles through the curve. It is known to fit a tapered sleeve over a cylindrical core, see Stumpf U.S. Pat. No. 3,934,951. Known sleeves, however, have a relatively thick wall in order to support articles carried by the conveyor without deformation or damage. This adds to the cost and weight of the sleeve.

BRIEF SUMMARY OF THE INVENTION

The sleeve disclosed herein has a tapered wall with radial internal ribs which both strengthen the wall and mate the sleeve to the cylindrical roller core on which it is mounted. The wall thickness is minimized, saving material and weight. The sleeve is pressed onto the roller core. The inner edges of the ribs have an interference fit with the surface of the core.

DETAILED DESCRIPTION OF THE INVENTION

Plastic tapered sleeve 10 is mounted on a cylindrical core 12 which may be a cylindrical carrying roller for a conveyor. The core has axles 14 for mounting between the conveyor side plates (not shown). Sleeve 10 is preferably composed of segments 10a, 10b, and 10c which join to provide a tapered roller surface.

Figure 1:
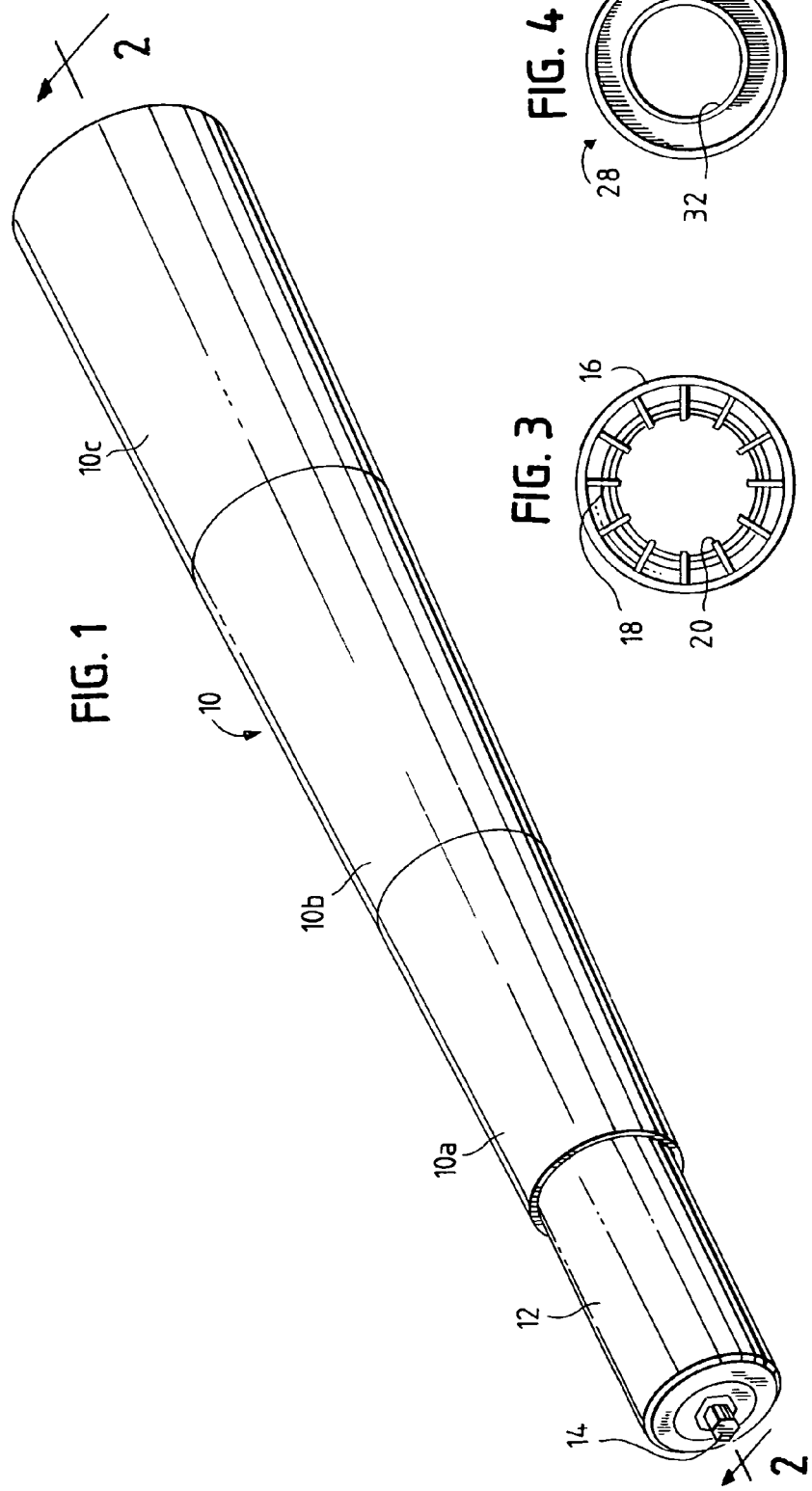
FIG. 1 is a perspective view of the tapered sleeve mounted on a cylindrical roller core.
Figure 3:
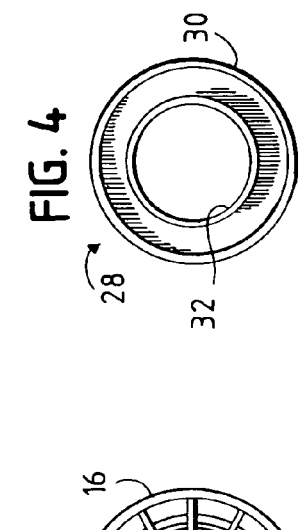
FIG. 3 is an end view of a segment of the plastic sleeve.

Each sleeve segment has a tapered wall 16, FIG. 3, of uniform thickness and having internal radial ribs 18. The inner edges 20 of the ribs rest on the surface of cylindrical core 12 and have interference fit with the surface. Alternatively, or additionally, the inner edges of the ribs may be secured to the core surface with an adhesive, as at 21.

Typical roller conveyors have a minimum width of 18 inches and are increased in size in 6-inch steps. The smallest segment 10a of the sleeve has a length of 5 inches and successive segments, 10b, 10c have a length of 6 inches. Two segments with a length of 11 inches are used for an 18 inch conveyor. Additional 6-inch segments can be added to accommodate wider conveyors.

Figure 2:
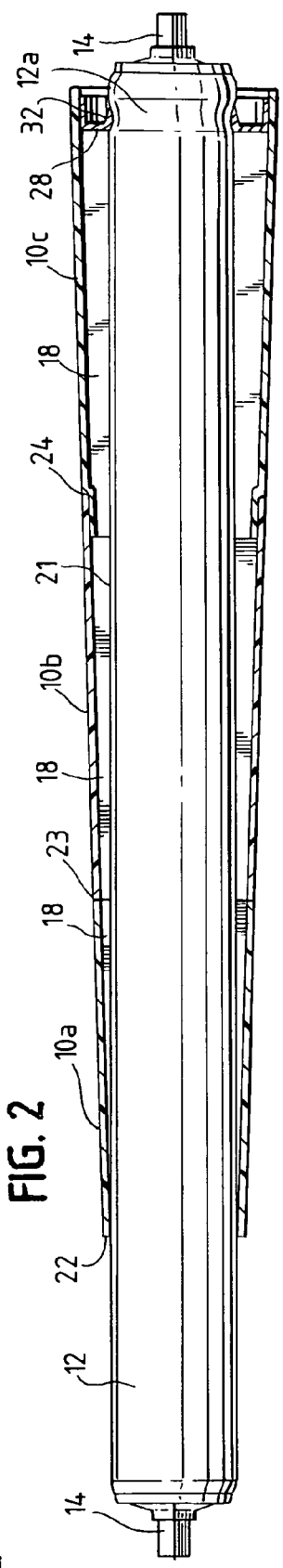
FIG. 2 is a longitudinal section of the tapered sleeve with the cylindrical core shown in elevation, as indicated by line 2-2 of FIG. 1.

The smaller end 22 of the smallest sleeve segment 10a engages the surface of roller 12, as seen in FIG. 2. The adjoining ends of the segments can abut as shown at 23 or have a stepped telescoped configuration as shown at 24.

Figure 4:
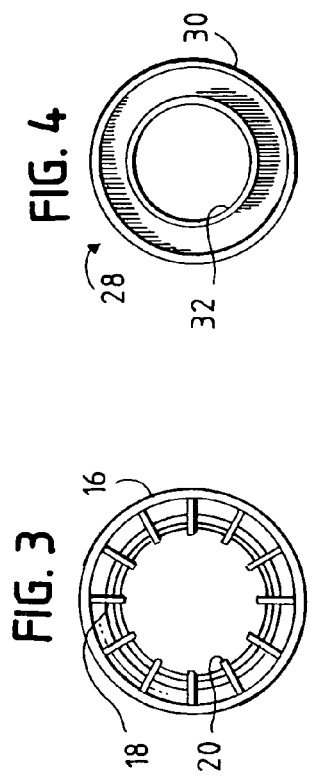
FIG. 4 is an end view of an end cap for the sleeve.

The open larger end of the largest sleeve segment 10c is closed by end cap 28. The end cap has a U-shaped cross-section, seen in FIG. 2, with an outer leg 30 and an inner leg 32, FIG. 4. Inner leg 32 is received in a groove 12a in the surface of core 12. The mating surfaces of groove 12a and leg 32 preferably have an arcuate configuration. The end cap 28 locks the plastic sleeve segments in place on the cylindrical core to prevent them from sliding during operation. End cap 28 also serves as a guard to prevent an operator's finger or foreign matter from being caught in the ribs of the sleeve.

What is claimed is:

1. In a tapered roller for a curved section of a roller conveyor, the tapered roller having a cylindrical roller core with a cylindrical outer surface, the improvement comprising:

a sleeve having a tapered wall with internal radial ribs, the ribs having inner edges which define a cylinder to directly mate with the outer surface of the cylindrical roller core, whereby the surface contact area between the sleeve and roller core along the cylinder is limited to the inner edges of the ribs.

2. The improved tapered roller of claim 1 in which the inner edges of the ribs and the surface of the roller core have an interference fit.

3. The method of assembly of the tapered roller of claim 2, comprising:

pressing the sleeve on the core, whereby the inner edges of the ribs have an interference fit with the surface of the roller core.

4. The improved tapered roller of claim 1 further comprising an adhesive securing the inner edges of the ribs to the surface of the roller core.

5. In a tapered roller for a curved section of a roller conveyor, the tapered roller having a cylindrical roller core, the improvement comprising:

a sleeve having a tapered wall with internal radial ribs, the ribs having inner edges which define a cylinder to mate with the surface of the cylindrical roller core; and an end cap ring having a U-shaped cross section with an outer leg and an inner leg fitted in the larger end of the tapered wall of the sleeve between the inner surface of the wall and the surface of the cylindrical roller core.

6. The improved tapered roller of claim 5 in which the inner leg of the end cap ring is received in a groove around the surface of the cylindrical roller.

7. The improved tapered roller of claim 6 in which the inner surface of the inner leg of the end-cap ring and the groove in the surface of the cylindrical roller have mating arcuate configurations.

* * * * *